(12) United States Patent
Schober et al.

(10) Patent No.: US 8,333,128 B2
(45) Date of Patent: Dec. 18, 2012

(54) ELECTRONIC SELECTOR LEVER MODULE

(75) Inventors: Thomas Schober, Hahnbach (DE);
Thomas Deichler, Sulzbach-Rosenberg (DE); Hans-Ludwig Gotz, Hahnbach (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 506 days.

(21) Appl. No.: 12/668,062

(22) PCT Filed: Jul. 11, 2008

(86) PCT No.: PCT/EP2008/059089
§ 371 (c)(1),
(2), (4) Date: Jan. 7, 2010

(87) PCT Pub. No.: WO2009/007449
PCT Pub. Date: Jan. 15, 2009

(65) Prior Publication Data
US 2010/0175494 A1    Jul. 15, 2010

(30) Foreign Application Priority Data

Jul. 12, 2007  (DE) .......................... 10 2007 032 545
Dec. 21, 2007  (EP) ...................................... 07150371

(51) Int. Cl.
*F16H 59/10*       (2006.01)
(52) U.S. Cl. ................ 74/473.12; 74/473.18; 74/473.33
(58) Field of Classification Search ............... 74/473.12, 74/473.18, 473.33, 471 XY
See application file for complete search history.

(56) References Cited

U.S. PATENT DOCUMENTS

| | | |
|---|---|---|
| 6,415,677 B1 | 7/2002 | Skogward |
| 6,731,194 B1 | 5/2004 | Abe |
| 2003/0167858 A1 | 9/2003 | Terui et al. |

FOREIGN PATENT DOCUMENTS

| | | |
|---|---|---|
| DE | 103 19 720 B3 | 9/2004 |
| DE | 10 2006 021 078 B3 | 8/2007 |
| EP | 1 063 495 A2 | 12/2000 |
| EP | 1 342 983 A2 | 9/2003 |
| EP | 1 992 845 A2 | 11/2008 |
| WO | 98/03803 A2 | 1/1998 |
| WO | 99/06846 A1 | 2/1999 |
| WO | 99/11951 A1 | 3/1999 |
| WO | 01/11271 A1 | 2/2001 |

*Primary Examiner* — William C Joyce
(74) *Attorney, Agent, or Firm* — Davis & Bujold, PLLC

(57) ABSTRACT

An electronic selector lever module for generating gear shifting signals for an automatic transmission of a vehicle. The swivel motion of the gear selector lever, within a main shifting path, is transformed into rotational motion for an angle sensor. The sensor is positioned on a printed circuit board and is actuated by a rotor. To guide the rotor relative to the angle sensor, the rotor either surrounds a rounded part of the printed circuit board or surrounds a rotor guidance which is mounted on the printed circuit board. The mechanical linking point is a short sleeve at a slider, which both belong to the rotor, needed for the shifting path motion, and which also drive the tilting lever for the transverse motion. The slider can be moved, relative to the rotor, along rails, either radially and directly at the rotor, or tangentially to the pivot point of the rotor.

20 Claims, 19 Drawing Sheets

ELECTRONIC SELECTOR LEVER MODULE

This application is a National Stage completion of PCT/EP2008/059089 filed Jul. 11, 2008, which claims priority from German patent application serial no. 10 2007 032 545.4 filed Jul. 12, 2007 and European patent application serial no. 07150371.8 filed Dec. 21, 2007.

FIELD OF THE INVENTION

The invention concerns an electronic selector lever module for generating gear shift signals for an automatic transmission, as known through the patent publication DE 103 19 720 B3. The publication basically reveals a printed circuit board comprising two groups of sensors and a mechanism, which transmits the motion of the selector lever to the sensors.

BACKGROUND OF THE INVENTION

The known splitter switching unit has a sensors, offset towards the side in regard to the selector lever switching path, whereby especially the printed circuit board is positioned in parallel with the level of the switching path. This electronic selector lever module works very reliable and its size is suitable for most of the applications. However, there exists applications in which the available space is not going to be sufficient.

Therefore, the invention also refers to an electronic selector lever module as described in the patent publication DE 10 2006 021 078 B. The publication of an electronic selector lever module solves a task, by maintaining the electric reliability, combined with the limited mounting space, making the module suitable for the different vehicles. In this configuration, the printed circuit board is not placed anymore sideways and in parallel to the slide path, but positioned in front of the slide path in a transverse alignment, so that the motion in the slide path D, N, R, P of the gear selector lever is facing the sensor side of the PCB. This alignment requires a reconstriction of the mechanism, which is linking the gear selector lever with the sensor actuators in the area of the printed circuit board.

At the input side and the output side, meaning at the time of motions, which are being entered through the gear selector lever, and providing the output through the PCB, a general principle remains in accordance with the invention, which has been proven through the modules in DE 103 19 720 B3 and DE 10 2006 021 078 B. The usual swiveling of the gear selector lever, within the main shifting path P, R, N, D, is converted to a rotation motion for an angle sensor.

A motion of the gear selector lever, transversal to the direction of the shifting path, can be, depending on the shifting boundary, a tilting motion for a manual gear selection, or can be interpreted, having a different shifting boundary, as a changing of a path into a second shifting path. In DE 10 2006 021 078 B, the transversal motion was linearly transformed for an additional sensor, which was also positioned as a way point sensor on the printed circuit board. At this point, an improvement of the mechanism, in accordance with DE 10 2006 021 078 B, became necessary. With the existing method, a problem arose in recognizing breakages. The motion of the gear selector lever is transferred by a bracket with a ball extension to the invented mechanism. If the bracket is going to break, either through excessive stress or misuse, the defect could not be detected until now.

A problem developed also in guiding the provided damping part, in addition to the present angle sensor's damping part. During the conversion of the gear selector lever's motion, transversal to the direction of the shifting path, it could happen that too much pressure or a misuse would cause an inaccurate analysis by the sensors.

Last but not least, also tolerances which are present within the moving track of the bracket with the ball extension, in accordance with DE 10 2006 021 078 B, need to be compensated and shall not cause any inaccuracies in the analysis.

Finally, the proper guidance of the rotor, relative to the angle sensor, needs to be present, using as few parts as possible, and having small distance tolerances.

SUMMARY OF THE INVENTION

The invention is therefore addressing the positive task of providing for an electronic gear selector lever module and to generate the gear shift signals, and
- to recognize a release of the mechanical linking position, caused by the break of the bracket,
- to achieve the task by using just a few parts,
- to guide most accurately the damping parts, needed for the transformation of the gear selector lever's motion, along and transversal to the shifting path,
- to perform the task, even if the motion track of the linked gear selector lever varies, due to mechanical tolerances.

The solution is achieved through an electronic selector lever module, having angle sensors.

The novelty of the invention is the presence of a second sensor, needed for the transversal motion, and being an angle sensor. Therefore, the carrier of the related transversal damping parts is now also a kind of rotor, here being designed like an elongated tilting lever, and being mounted rotatable. The mechanical linking point of the bracket's extension has now been doubled: the rotor for the shifting path motion, as well as the rotatable mounted tilting lever for the transversal motion, are being driven by means of a common, short sleeve at the linking point. The sleeve is firmly connected with the slider and being flexibly guided in a slot of the tilting lever.

The slider can be moved, relative to the rotor, in tracks. In a special embodiment, the tracks for the slider are not radial integrated with the rotor, but positioned tangential to the pivot point at an auxiliary device with a longitudinal slider. Hereby, it can be excluded that at certain motions of the slider, the rotor is also, even very slightly, being moved. These unwanted motions can be caused, for instance, through an impulse or excessive pressure, by the user, on the gear selector lever (misuse). For a special embodiment, parts are being added, such as a longitudinal slider, an auxiliary device with tracks, and an extension arm for the rotor.

An additional, important part of the invention is a precise guidance of the rotor, which either surrounds either the rounded edge of the printed circuit board or edges in a fork like shape into a rotor guidance on the printed circuit board.

BRIEF DESCRIPTION OF THE DRAWINGS

The invention is further presented through the patent drawings. Shown in.

DETAILED DESCRIPTION OF THE PREFERRED EMBODIMENTS

Figure 1:
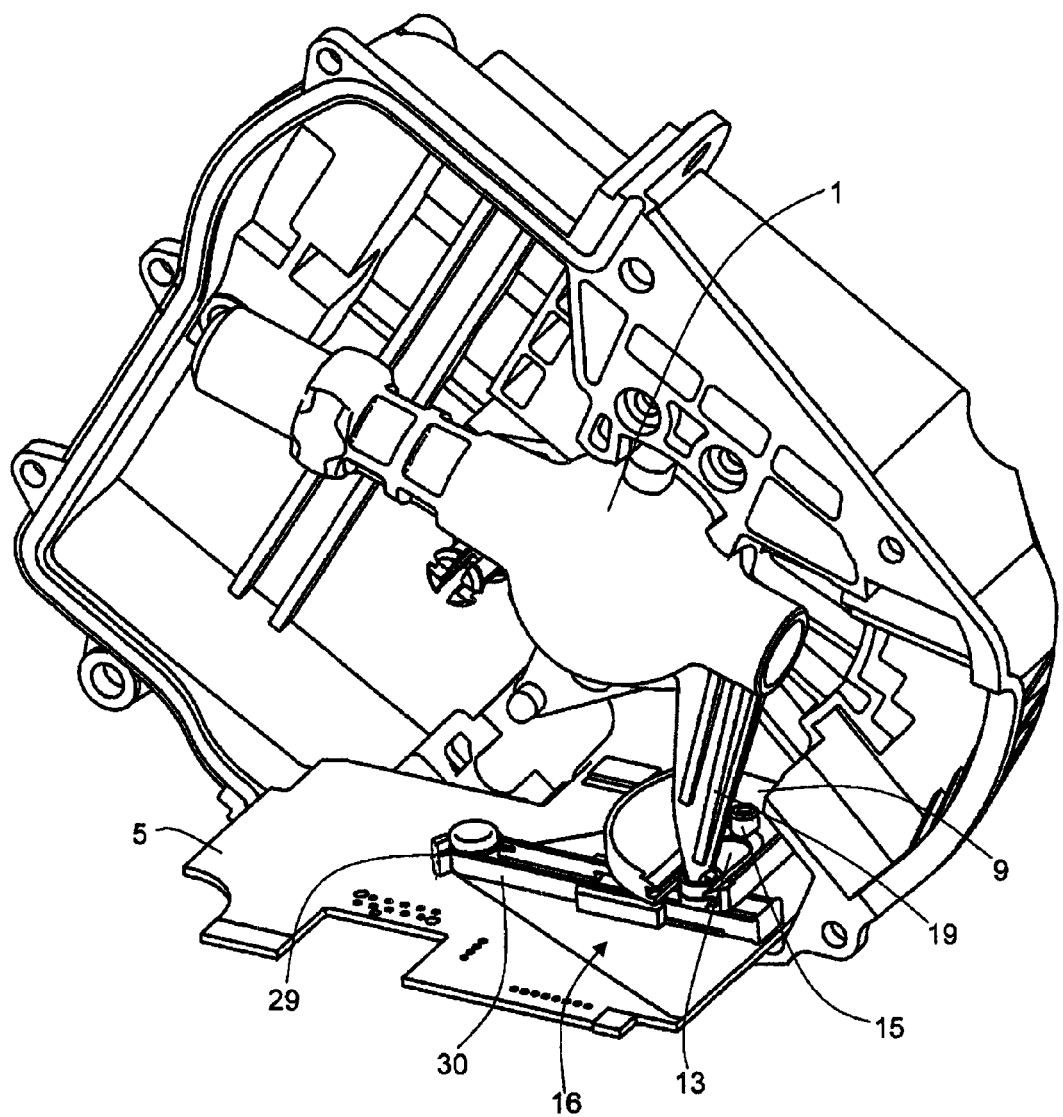
FIG. 1 is an enclosure with a shifting boundary, in which the gear selector lever is positioned, which transfers, in accordance with the invention, its motion to a selector lever module.
Figure 2:
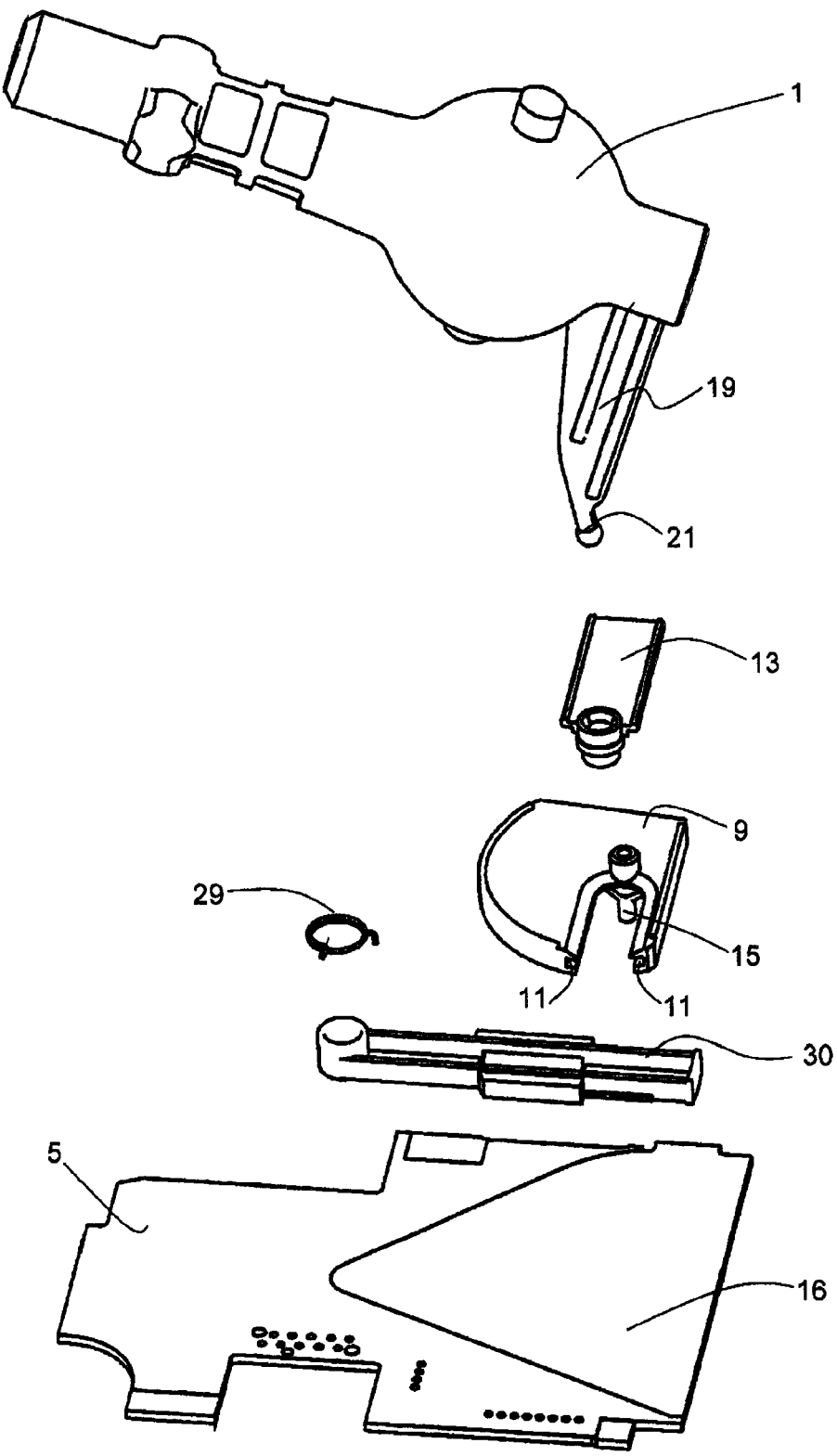
FIG. 2 is a perspective, exploded drawing, presenting the invented selector lever module.
Figure 3A:
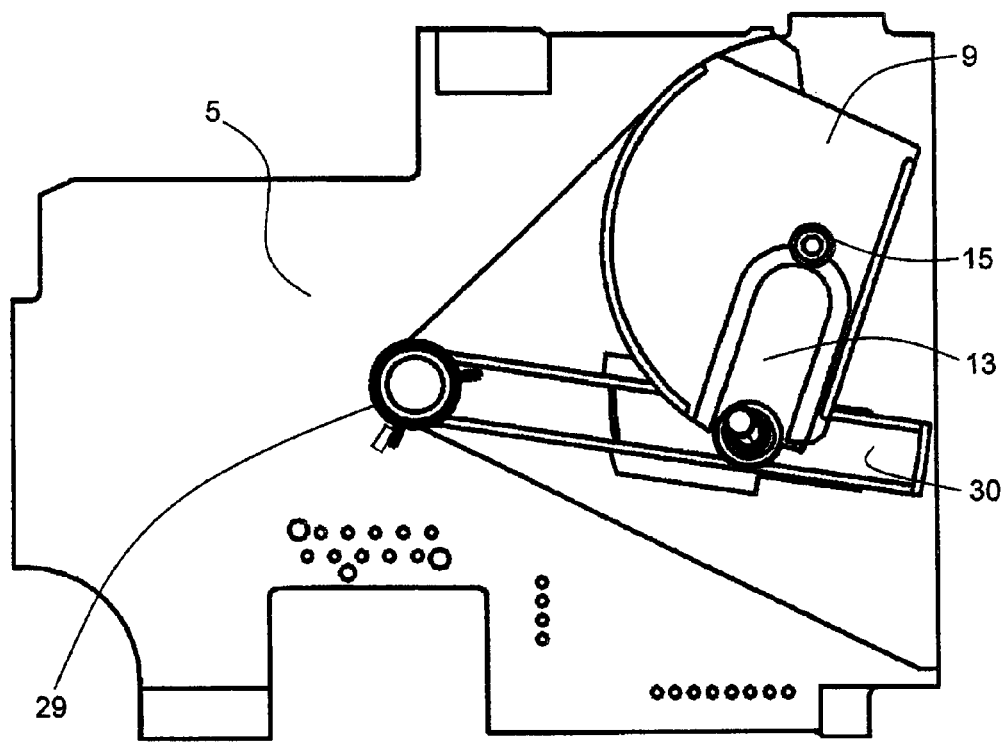
FIG. 3a is a top view of the invented selector lever module, whereby the rotor position corresponds to a position D of the gear selector lever.
Figure 3B:
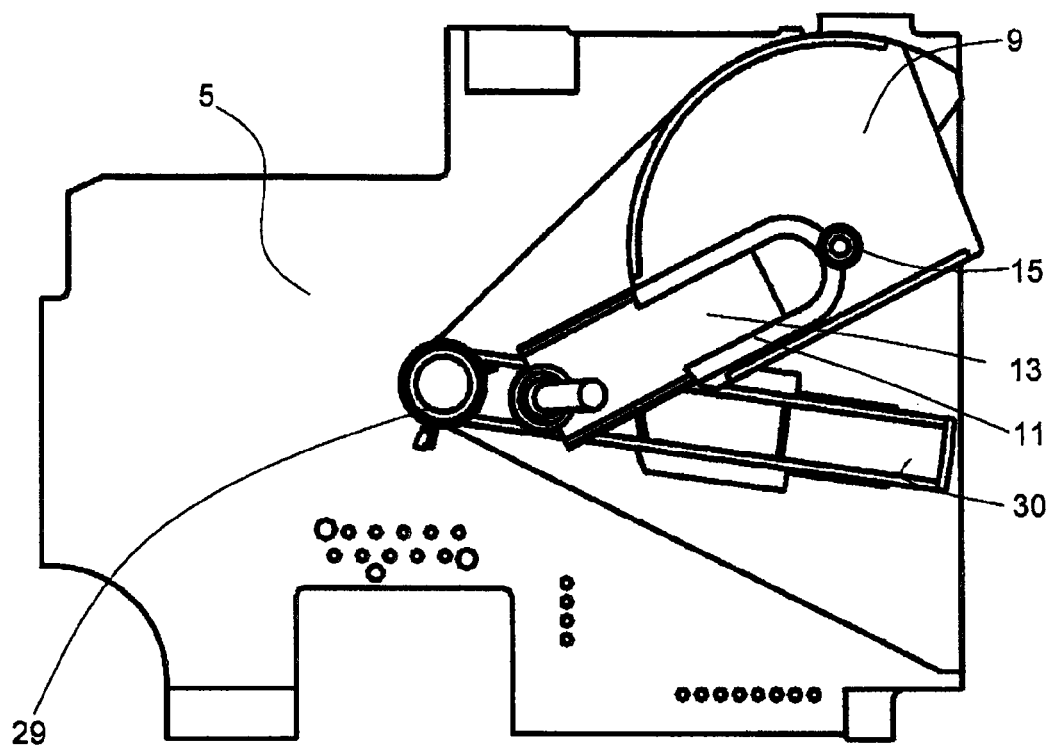
FIG. 3b is a top view as in 3a, but the rotor position corresponds to the position P of the gear selector module
Figure 3C:
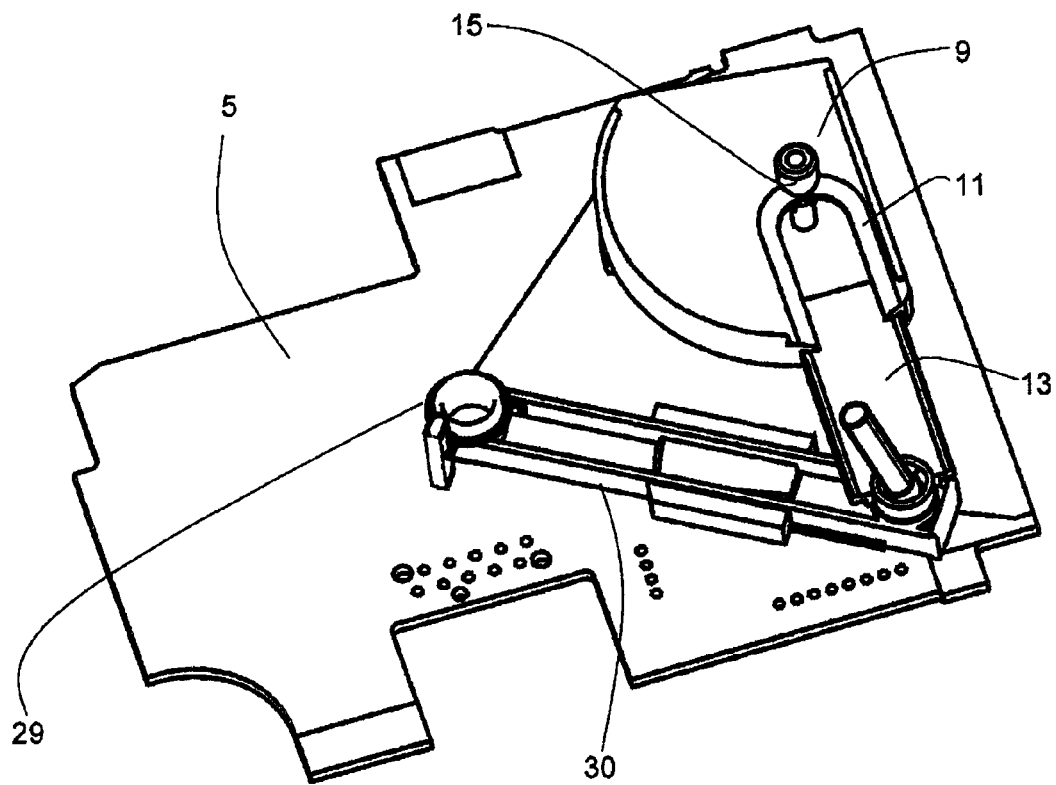
FIG. 3c is a perspective presentation of the invented selector lever module with the rotor and tilting lever, whereby the position of the linking point corresponds with a "displacement at break" position of the gear selector level.
Figure 4:
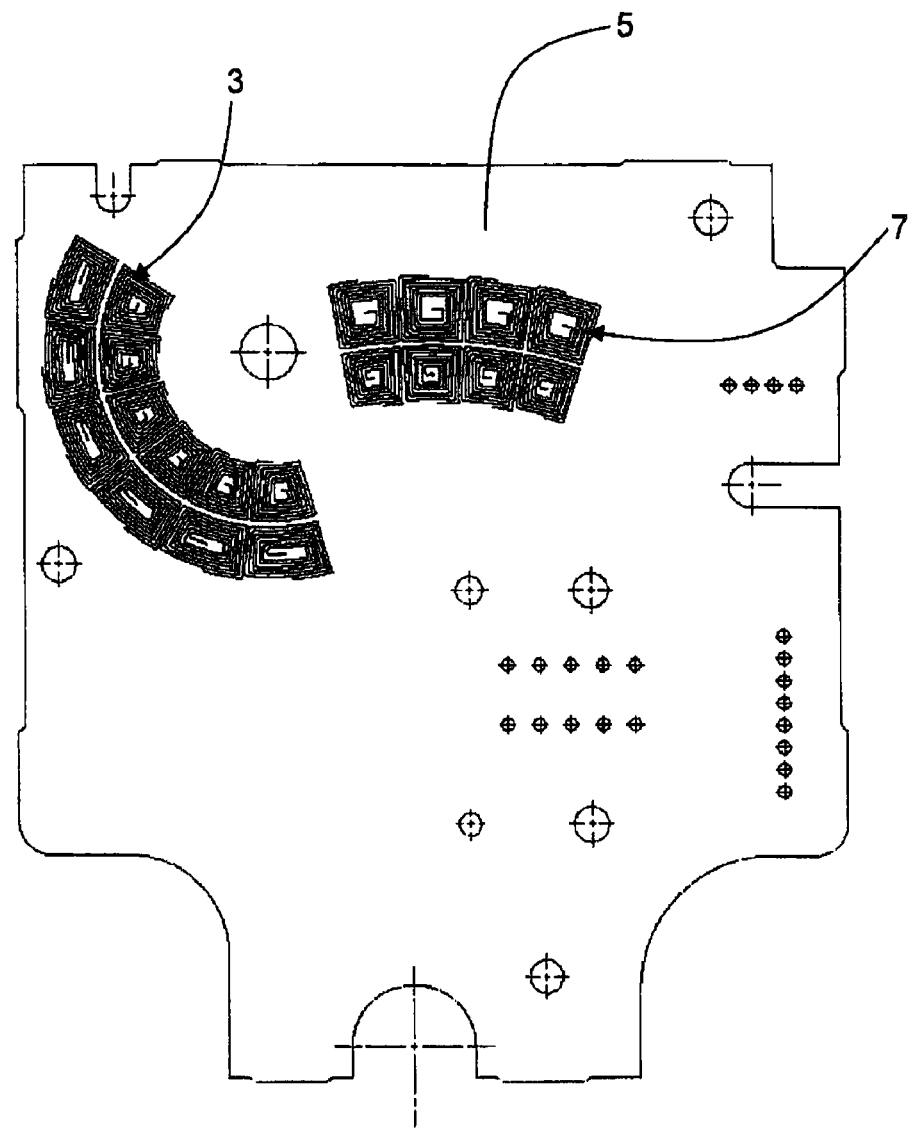
FIG. 4 is a presentation of a printed circuit board of the selector lever module which shows a possible configuration of the angle sensor's inductors.

The following table shows three embodiments of a layout of the shifting boundary. The conversion of these motions in the selector lever module can be seen in FIG. 1 to FIG. 4.

| Layout 1 | Layout 2, Left Steering | Layout 3, Right Steering |
|---|---|---|
| P | P | P |
| R | R | R |
| N | N    M+ | M+    N |
| D- - -D- -D+ | D- - -M | M- - -D |
|  | S    M- | M-    S |

Hereby, Layout 1 describes a simple shifting boundary, having the usual positions P, R, N, and D in a shifting path, as well as a transversal motion, which, starting in automatic position D allows manual selection, as known in TIPTRONIC®, of D+ and D−. Within the shifting path, the positions P, R, N, and D are passed through and hereafter detected in the selector lever module through a rotor 9; the transversal motion towards D+ or D− is detected by the rotatably mounted tilting lever 30.

In the Layouts 2 and 3 for Left Steering or Right Steering, respectively, the sensor functions as follows:

The tilting Lever 30 is not moving in the main shifting path; the positions P, R, N, D, and S will be detected through the rotor 9.

A path change from D to M is detected by the tilting lever 30, with the help of a slider 13 being guided in rails 11, and compensated for at the rotor 9.

Also the rotor 9 is supported by a leg spring 35. Therefore it can be guaranteed, that the rotor 9 is removed from the area of action in the case of a material break.

The inductor coils of both angle sensors 3 and 7 are redundant, meaning one-failure correcting, and two-failure-recognition, and positioned in at least two arcs. A contact free operating damping rotor 9 and 30 is respectively positioned above each of the circular mounted inductor coils. The damping rotor 9, for detecting the shifting positions P, R, N, D, S, is directly linked through rails 11 with the slider 13, and its sleeve 37, and in addition, is also guided in a slot of the tilting lever 30.

Due to the tilting lever 30, any excessive pressure or misuse, that is initiated by the driver or mechanical impact, due to tolerances or by driving on uneven surfaces, can be compensated for. Through the novel tilting lever 30, constant and undistorted signals are obtained, which makes them easier to analyze with the sensors.

An additional damping part for damping the inductor coils of the additional angle sensor 7 is positioned on the bottom side of the tilting lever 30 in the area of the path change detector field with its angle sensor 7. These inductor coils detect the path changes. After the path change, the slider 13 of the first rotor 9 is again moved along the guide in the tilting lever 30. The tilting M+, M− will be detected in this layout 2 and layout 3 by the first rotor 9.

To recognize a break of the tappet (bracket 19 of gear selector lever 1 with ball extension 21), a preloaded spring 29 will be inserted in the rotatable bearing of the tilting lever 30. In case the tappet 19, 21 breaks, which normally would result in the tilting lever 30 remaining in its basic position, the spring relaxes and moves the tilting lever 30 away from the regular damping area of the additional angle sensor 7. Either an additional inductor coil can be positioned outside of the regular area of function, recognizing the breakage, or the presence of a material breakage can also be determined by a missing, false or standard signal.

The sleeve 37, which is used in the state of the art DE 10 2006 021 078 B, is integrated in this invention in the slider 13 in a way, such that it can be guided by the tilting lever 30, as described above. In the apparatus of the invention, the tilting lever 30 is used, at the same time, as a spacer for the printed circuit board 5. Sliding tracks are provided at the place where the mechanical coupling point is pressed against the supporting printed circuit board 5 (not shown in the patent drawings).

Figure 5A:
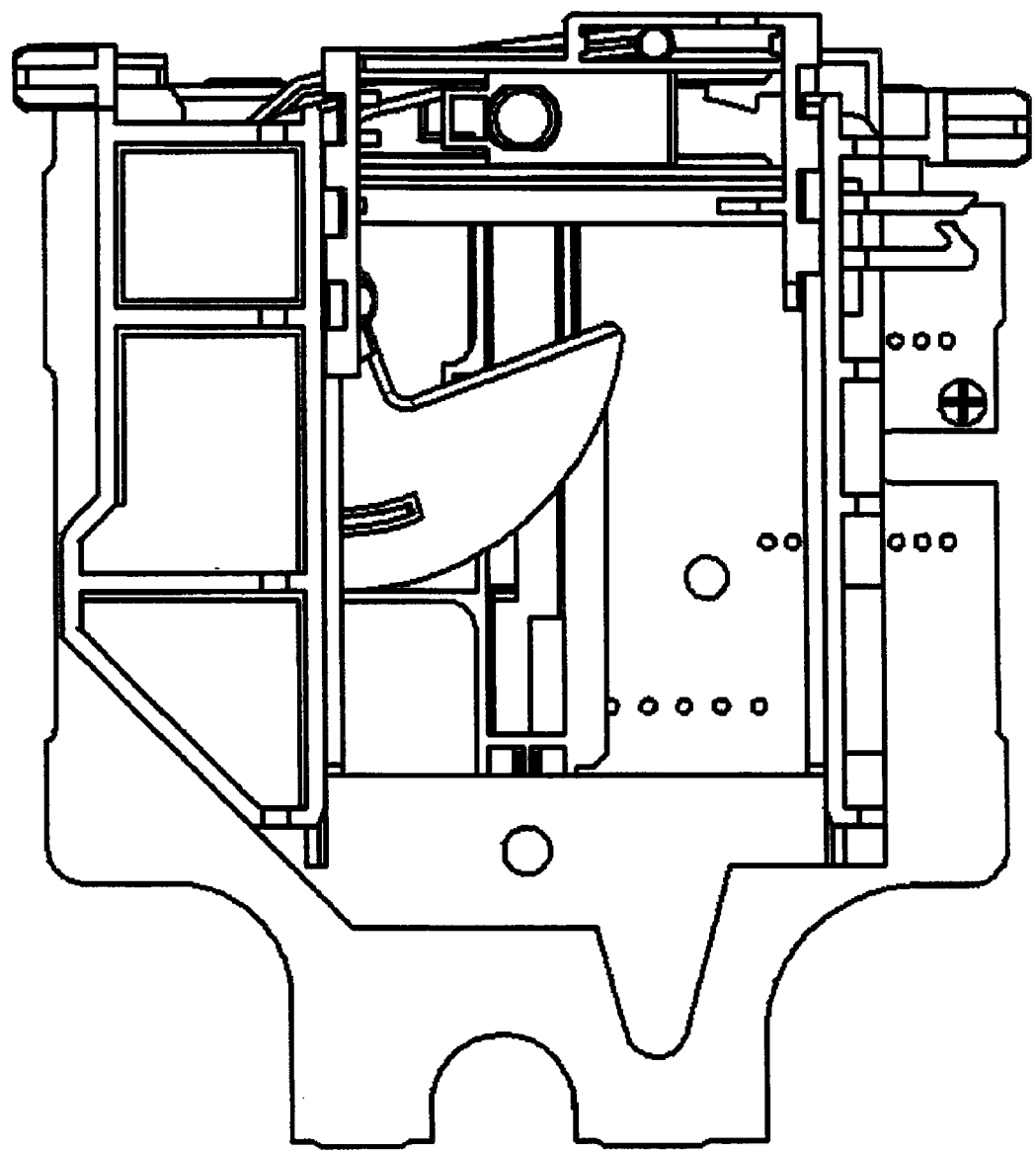
FIG. 5a is a top view of an additional embodiment of the invented selector lever module, whereby the rotor position corresponds with the shift position S of the gear selector lever.
Figure 5B:
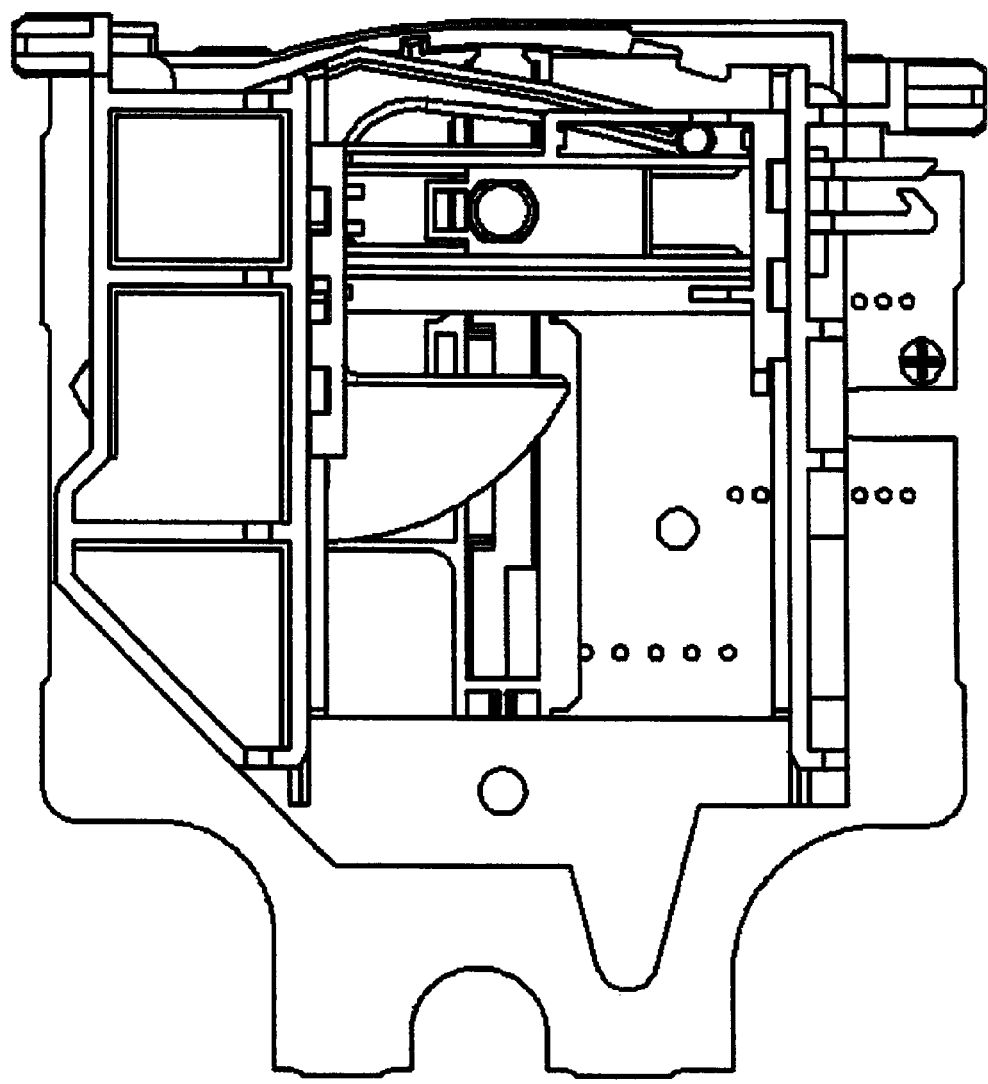
FIG. 5b is a top view as in FIG. 5a, whereby the rotor position corresponds with a shift position D of the gear selector lever.
Figure 5C:
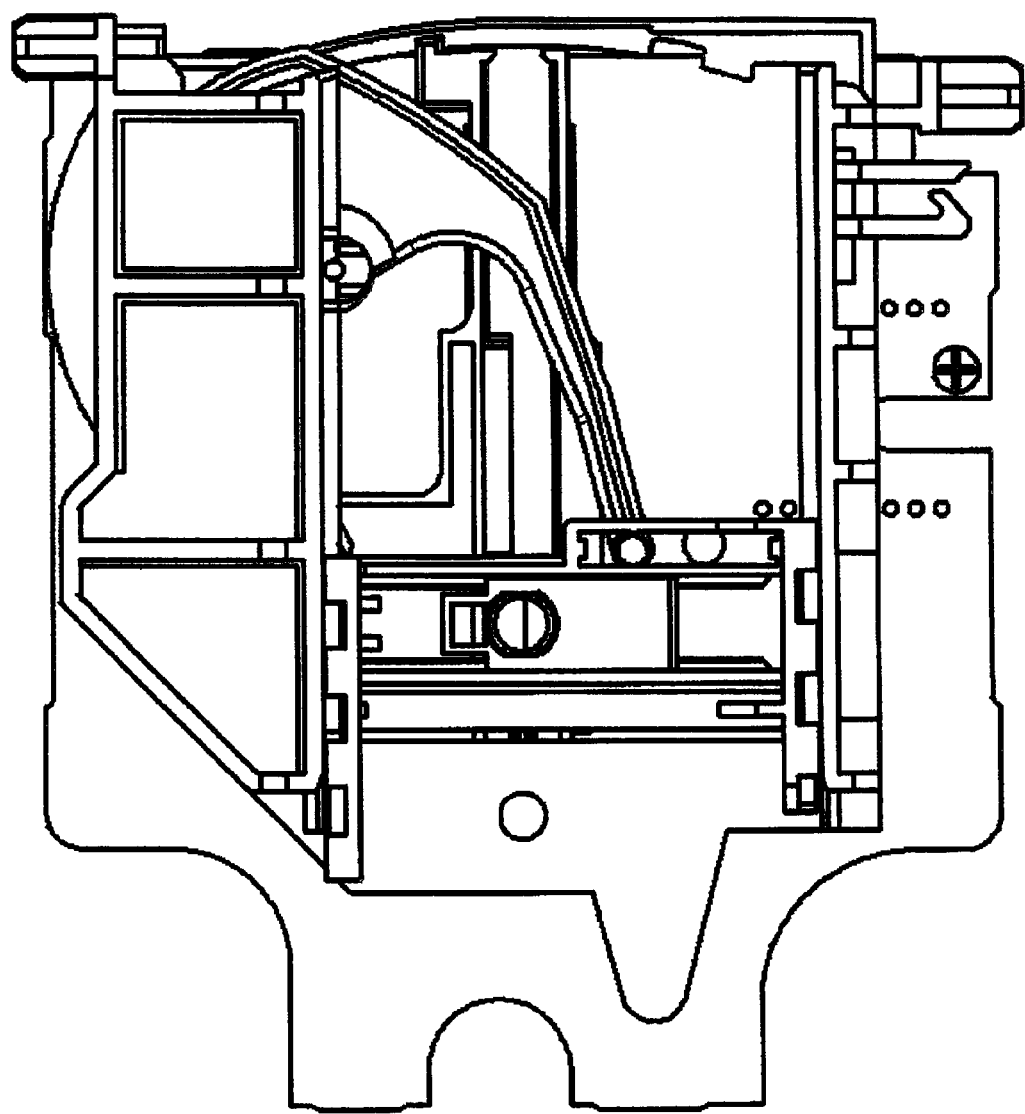
FIG. 5c is a top view as in FIGS. 5a and 5b, whereby the rotor position corresponds with the shift position P of the gear selector lever.

FIGS. 5a, 5b, and 5c present an additional embodiment of the invention, for the three shifting positions S, D, and P of the gear selector 1. The rails for the slider 13 are different from the previously discussed embodiment, as they are not integrated in the rotor 9. In fact, the rails have been removed from the rotor 9 and are attached separately in the selector lever module by means of an auxiliary fixture.

This embodiment is for the most part identical with the previously described configuration, with the addition of a longitudinal slider, the auxiliary fixture with rails, and an extension arm for the rotor 9. The longitudinal slider is moveably mounted, to slide between the rails and the stationary auxiliary fixture. The slider now hereby accepts the longitudinal motions of the gear selector lever 1 in the shifting path. The auxiliary fixture is positioned above the complete assembly.

The slider 13 is guided inside of the longitudinal slider. At the same time, the extension arm of the rotor is associated with the longitudinal slider, for making sure that the rotor, at intended longitudinal motions of the gear selector lever in the shifting path, is always moved as well.

Because of the guidance of the slider 13 within the longitudinal slider, only moving in one direction, and by carrying along the rotor through the extension arm, the rotor cannot be moved anymore in the case of a misuse, an unambiguous signal will always be obtained.

Figure 6:
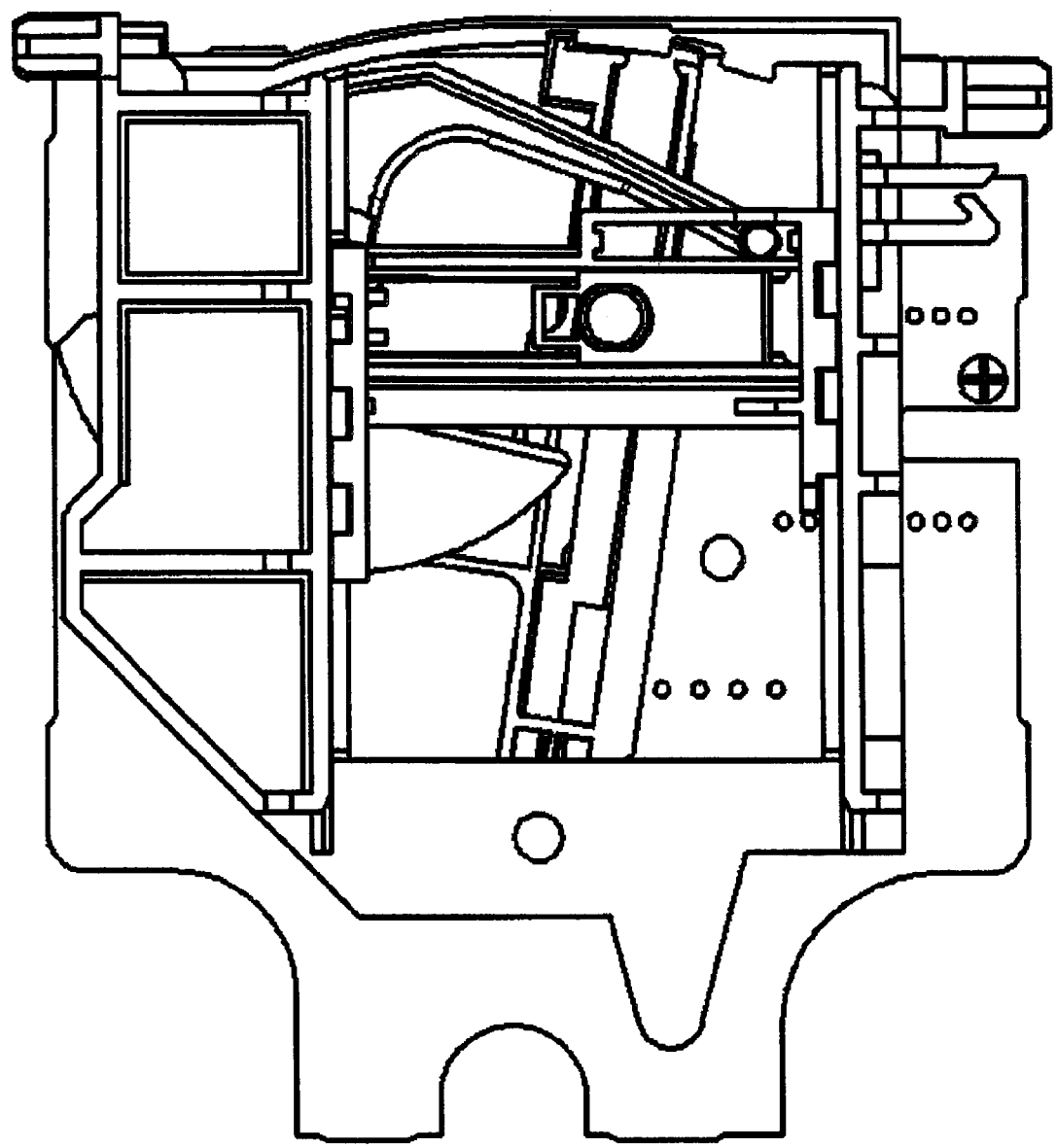
FIG. 6 is a top view as in FIG. 5b (shift position D), whereby the transversal motion of the tilting lever, due to the shifting path change, has been transferred to the tilting lever, and tilting motion M+ is executed in the second shifting path.
Figure 7:
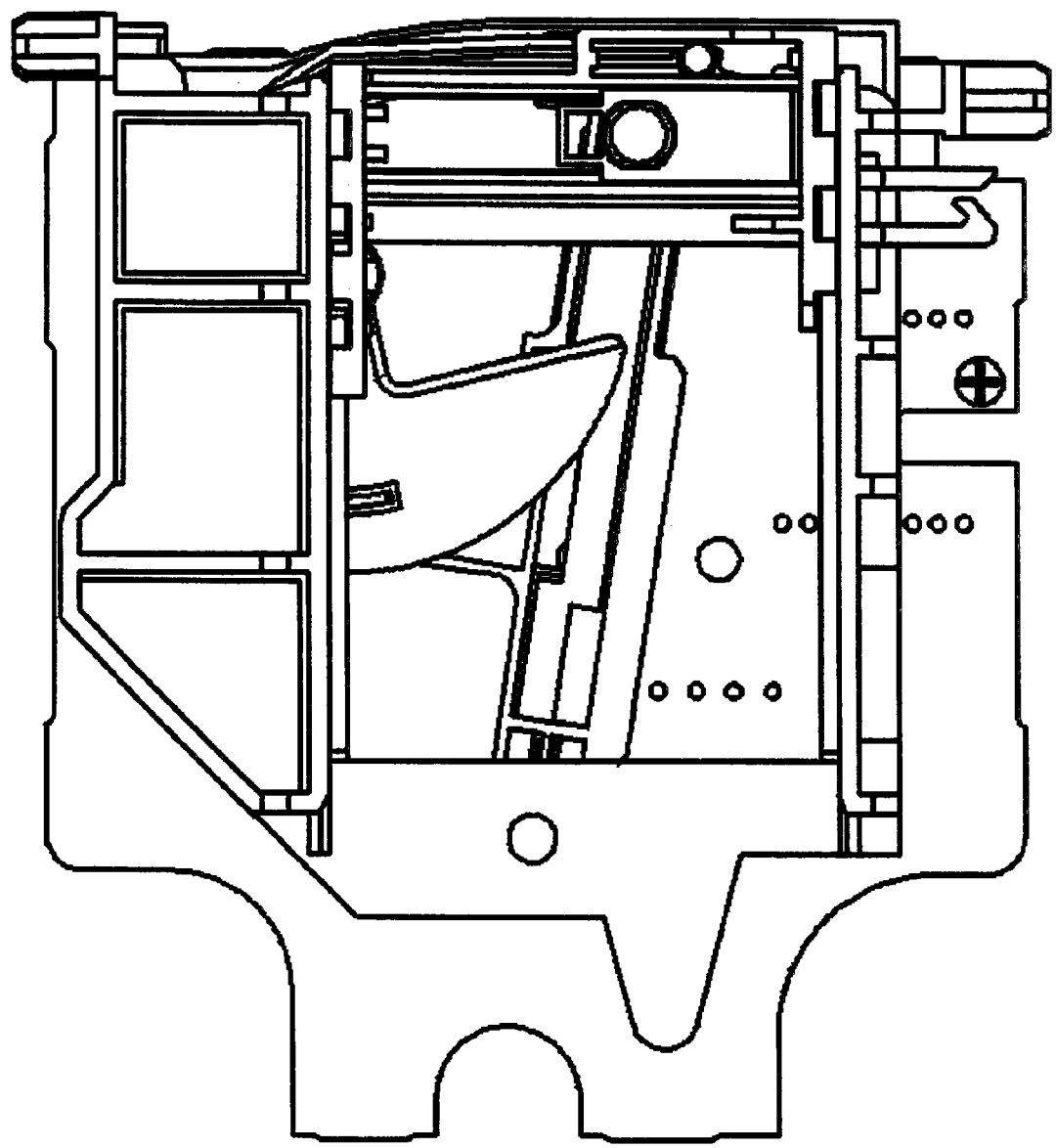
FIG. 7 is a top view as in FIG. 5b (shift position D), whereby the transversal motion of the tilting lever, due to the shifting path change, has been transferred to the tilting lever, and tilting motion M− is executed in the second shifting path.

FIGS. 6 and 7 show an additional shifting path, beginning in shifting position D (compare to FIG. 5b). The transversal motion leads through the slider 13, with its sleeve for the pivoting, to the pivoted tilting lever 30. In the new shifting path, the tilting motions M+ and M− can be executed, which lead to a new longitudinal motion of the longitudinal slider, with the corresponding transfer to the extension arm of the rotor.

The additional advantages resulting from this invented fixture are:

Through shifting of the pivot point of the tilting lever 30, the ratio of the angle can be adjusted upon request. Hereby, the distance covered by the selector lever 1 can be transposed from a small angle into a larger angle, and vice versa.

The invented fixture is designed for any version of an automatic transmission, meaning that recognition of the position can be achieved for any layout, like the H-, X-, T-Layout, etc.

The present selector lever module is as space saving as the previous model, in accordance with DE 10 2006 021 078 B, although an additional safety function has been implemented.

Figure 8:
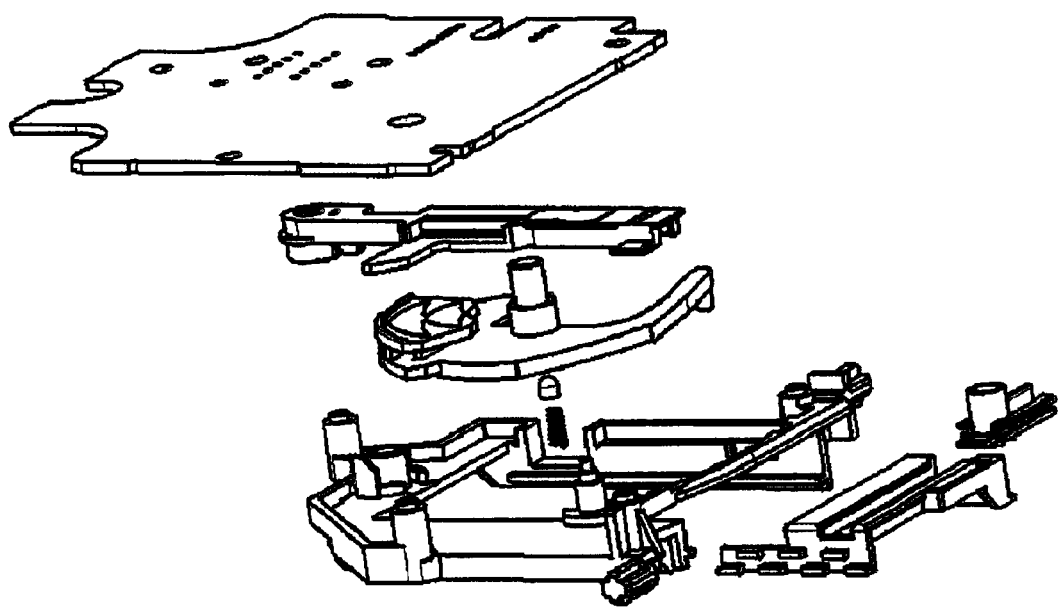
FIG. 8 is a perspective, exploded view of the invented selector lever module, with a spring system and with the printed circuit board.
Figure 9:
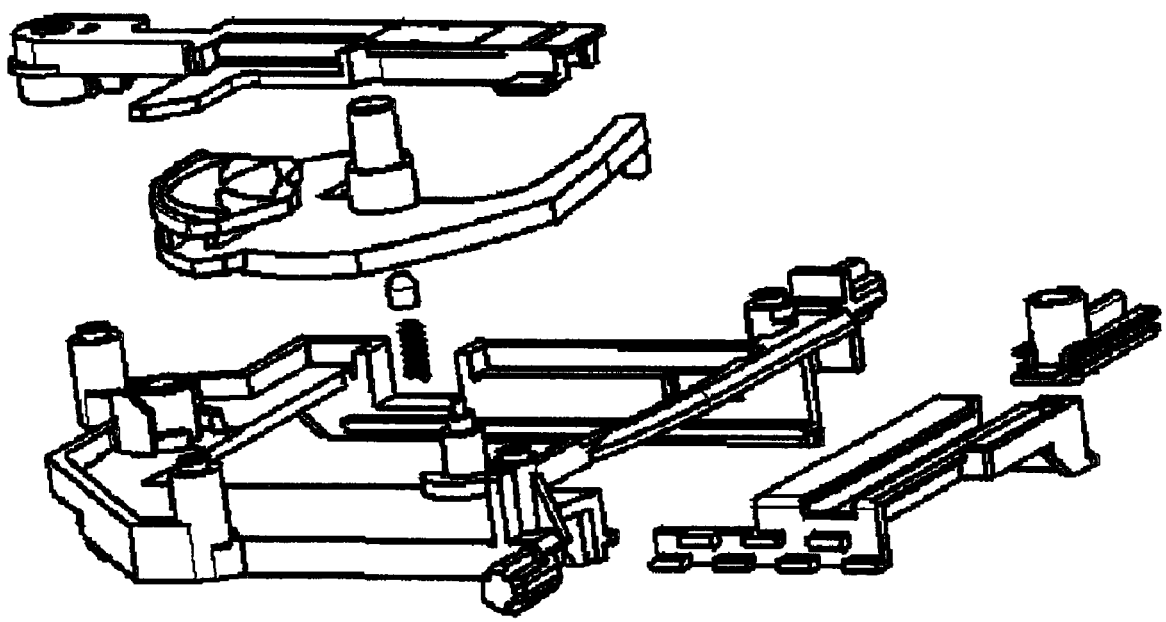
FIG. 9 is a perspective, exploded view of the invented selector lever module, showing the spring system as in FIG. 8, but without the printed circuit board.
Figure 10A:
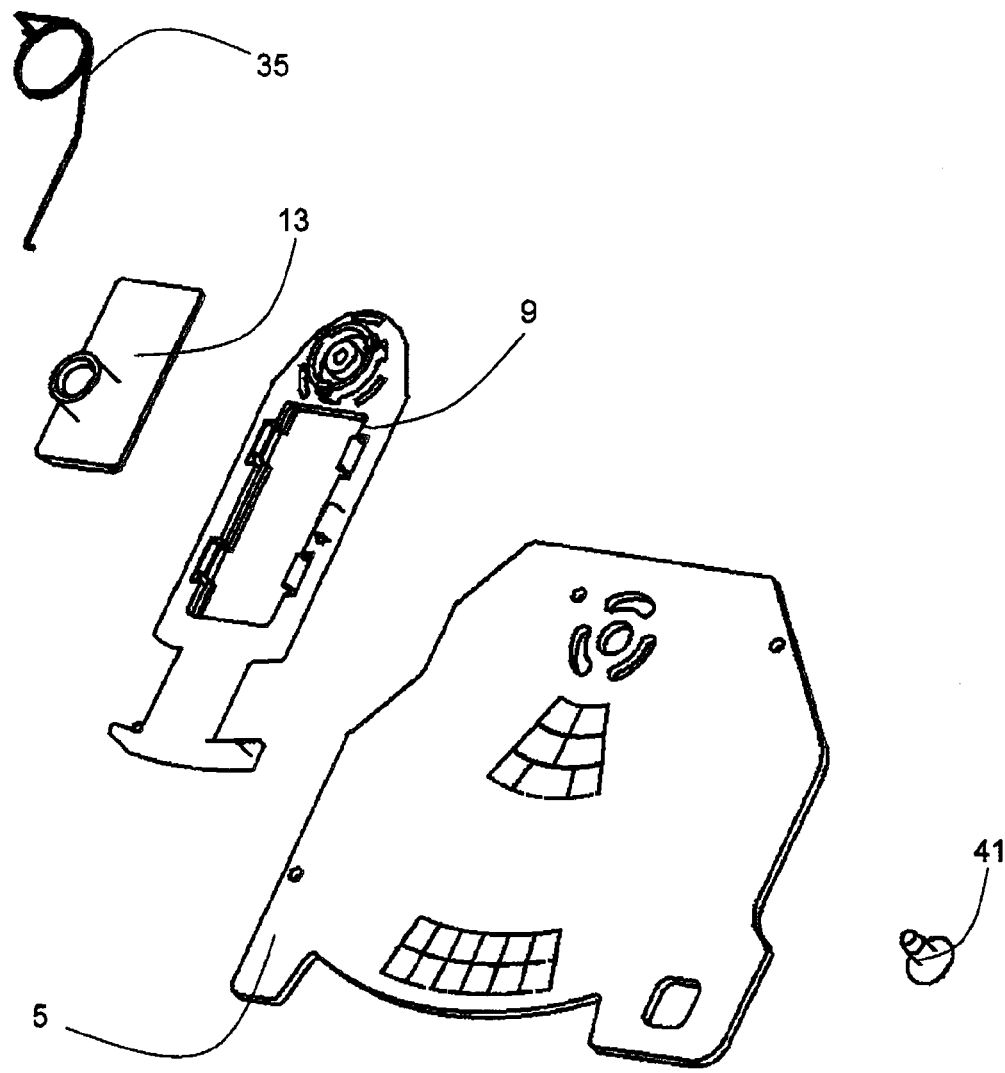
FIG. 10a is a perspective, exploded view of a special, preferred angle sensor, viewed towards the sensor side of the printed circuit board.
Figure 10B:
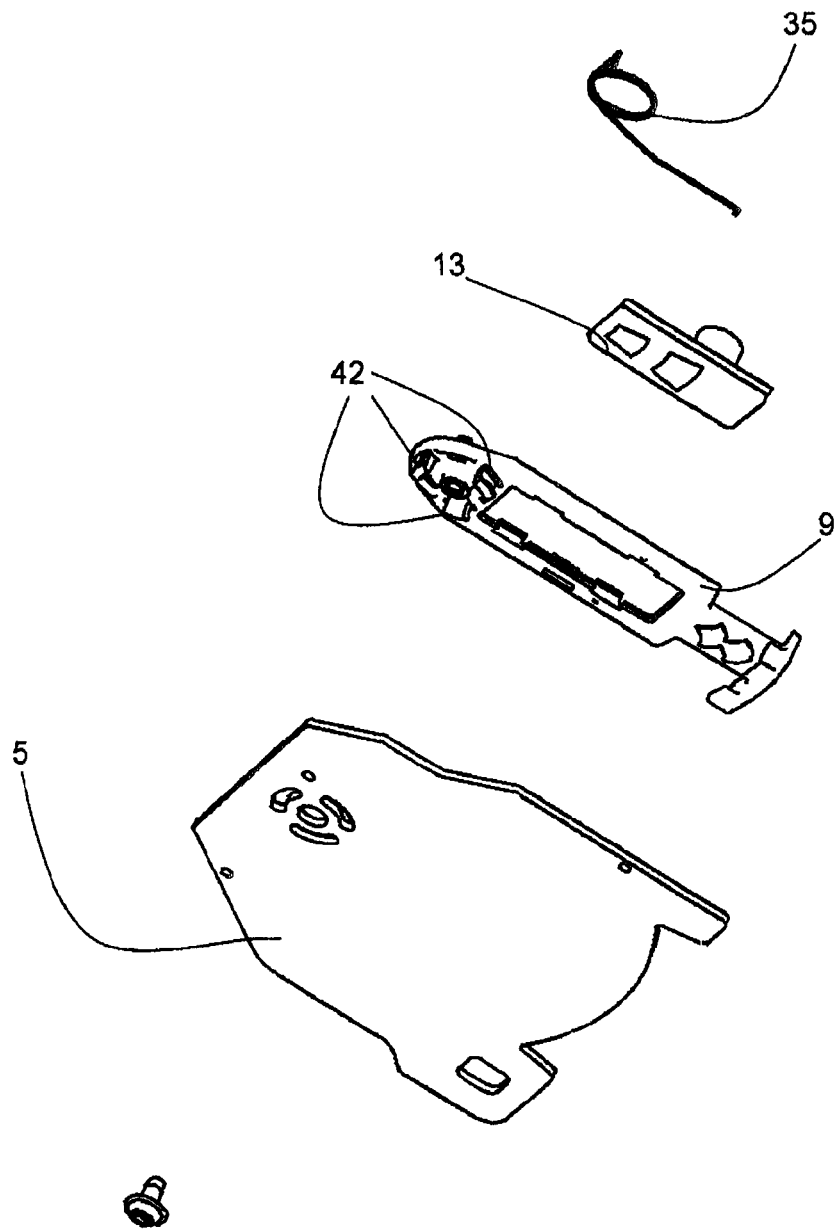
FIG. 10b is the angle sensor as in 10a, viewed from the bottom side of the printed circuit board.

The drawings 8 and 9 show a possible improvement of the selector lever, which is not absolutely necessary, but is preferred under certain circumstances. During shock or vibration, the rotor might move away from the printed circuit board. Also, due to wear in the bearing, the distance between the rotor and the printed circuit board might change. These mechanical disruptions are compensated for by a spring system, in accordance with FIG. 8 and FIG. 9. The spring system comprises a pressure spring 31, having a guiding part 32, and an axle receptacle 33, designed as a dome at the axle of the rotor in the bearing. The pressure spring is preloaded, through the receptacle 33, by use of the dome, and through the guiding part 32 in the rotor 9. The rotor 9 now possesses a closed axle receptacle 33 and is constantly pressed against the printed circuit board. However, it is not absolutely necessary to integrate the spring system with the selector lever module, but the following advantages arise from applying the additional spring 31:

The rotor 9 cannot be moved away from the printed circuit board during shocks. Therefore, the shifting positions can be detected accurately.

The detected signal cannot become intermittent during shocks. The rotor 9 cannot slide anymore along the section cut line of the printed circuit board 5, The shock related problem will increase by the wear of rotor 9. In that case, rotor 9 has more play and it is easier for the rotor to slide along the section cut line of the printed circuit board 5. The distance for signal recognition could vary. By means of the spring 31, also this wear is compensated.

Figure 11C:
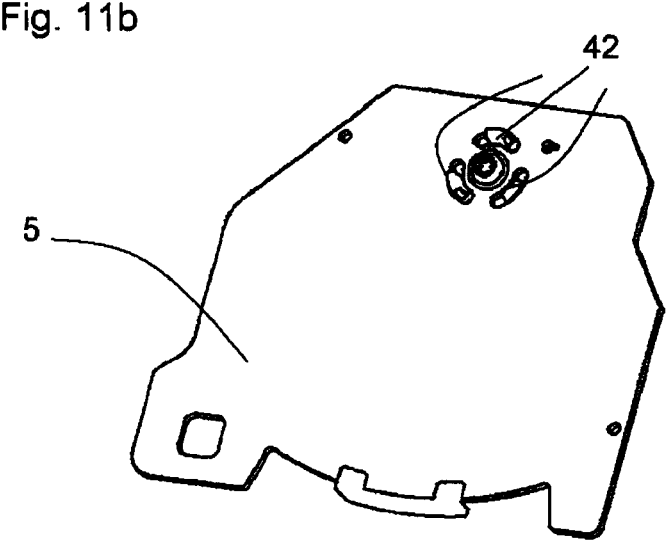
FIG. 11c is the angle sensor in accordance with FIG. 10b, in an assembled condition, viewed from the bottom side.
Figure 12A:
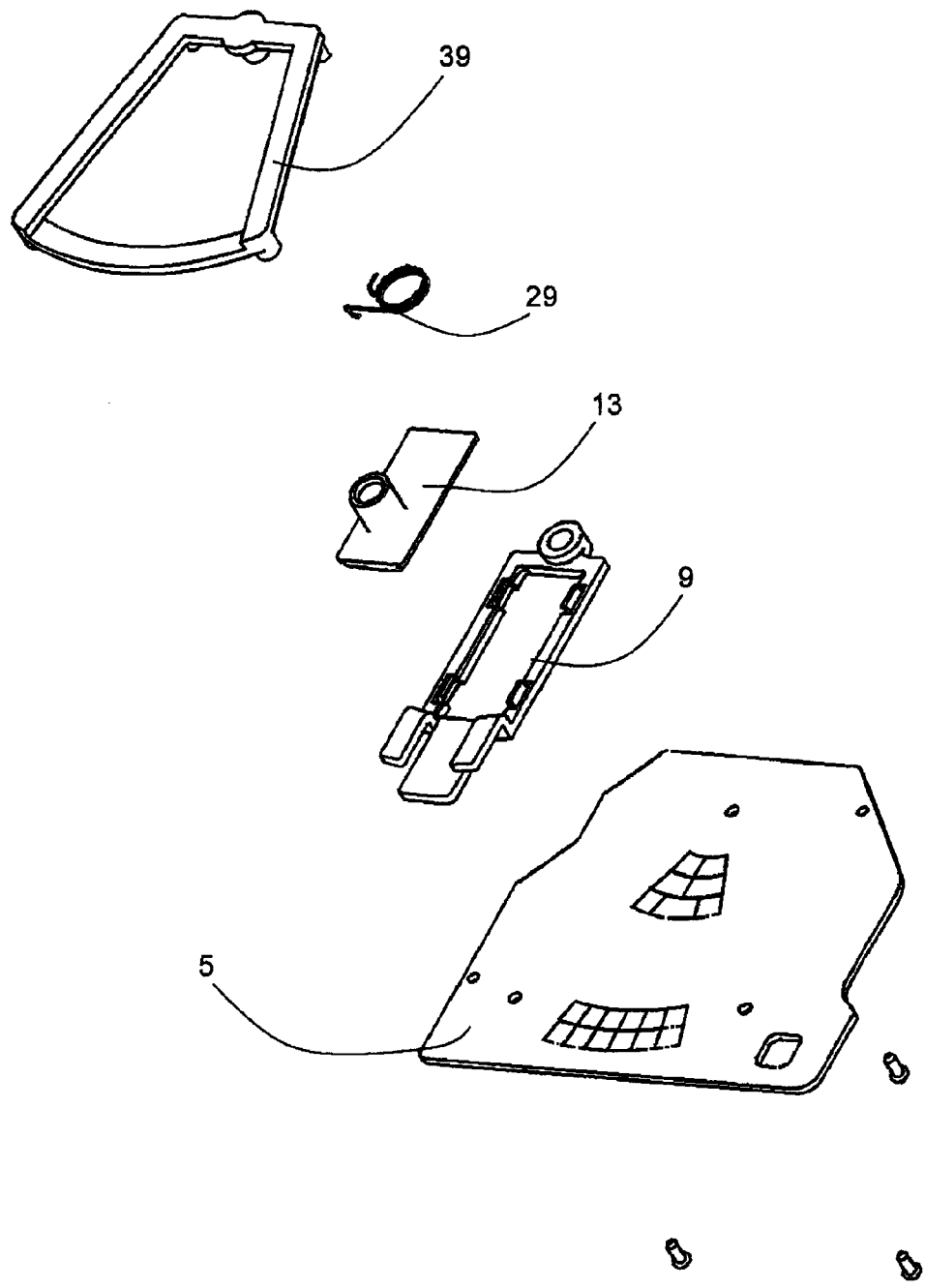
FIG. 12a is a perspective, exploded view of another embodiment of the angle sensor, viewed from the sensor side of the printed circuit board.

The drawings 10 and 11 present an additional embodiment for a particularly important configuration of the invented selector lever module. The exploded views in drawing 10a (top view of the sensor side of the printed circuit board) and drawing 10b (bottom view of the sensor board) show that a small number of parts for the sensor is sufficient. The assembly comprises of a leg spring 35, a slider 13, a rotor 9, a printed circuit board 5, and an optional fear screw 41. The printed circuit board carries the sensor coil inductors, configured as an arc, in a redundant design. The inductor coils serve on one hand for detecting the rotor motion for the shifting positions P, R, N, D, and on the other hand, for detecting the change of the shifting path. Located above the inductor coils is the rotor 9 with its slider 13, as it is seen in FIG. 12a. The rotor 9 is held by a preloaded leg spring 35, and can be moved away from the area of activity, in case of a malfunction. Through the snap-in hook 42, see FIG. 11c, the rotor 9 is kept in the pivot bearing. Generally, the rotor 9 just snaps into the printed circuit board. The fear screw 41 is not an essential part, it is an option for additional fastening.

Figure 11A:
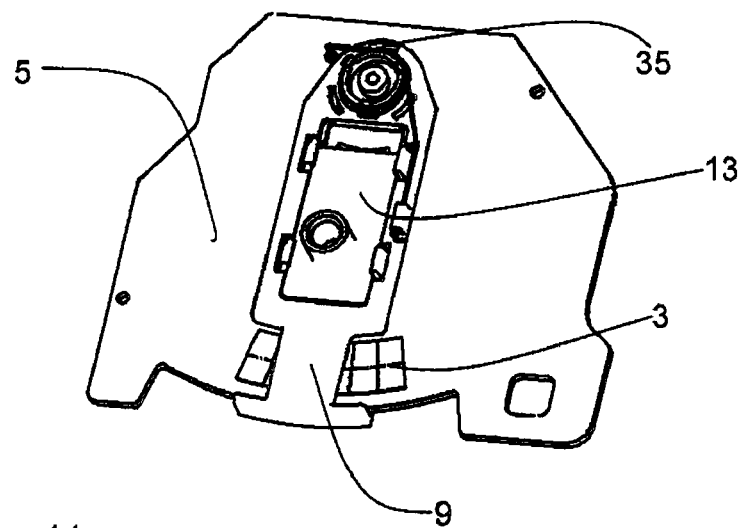
FIG. 11a is the angle sensor in accordance with FIG. 10a, in an assembled condition, viewed from the sensor side.
Figure 11B:
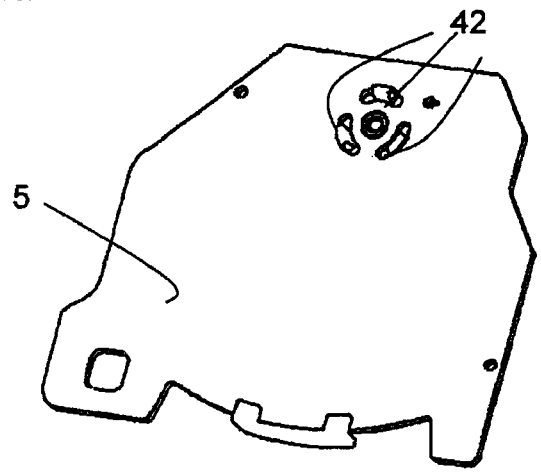
FIG. 11b is the angle sensor in accordance with FIG. 10b, without the gear screw, viewed from the bottom side.

The bearing of the rotor has a special feature comprised of three hooks near the bearing, which feed through the printed circuit board 5 as a flexible plug connection. The opposite end of the rotor 9 surrounds the printed circuit board 5 in an arc shape border. Present in this area of the printed circuit board 5 are the (not shown) sliding tracks, which enable guidance of the rotor 9 on the printed circuit board 5. On the back side of the printed circuit board 5, sliding tracks are also present to support the rotor 9 sliding. Therefore, the rotor 9 is in direct contact with the printed circuit board 5 and is also guided at the same time (FIGS. 11a, 11b, and 11c). Hereby, the damping part of the rotor 9 always has constant spacing in regard to the inductor coils on the printed circuit board 5, so that an essential feature of the sensor technology is met. Warping of the rotor 9, due to temperature influences, does not lead to lifting from the printed circuit board. Also, manufacturing tolerances in regard to warping of the printed circuit board 5 do not have an influence on the spacing anymore. Due to dual sided guidance of the rotor 9 on the printed circuit board 5, a forced guidance exists.

Figure 12B:
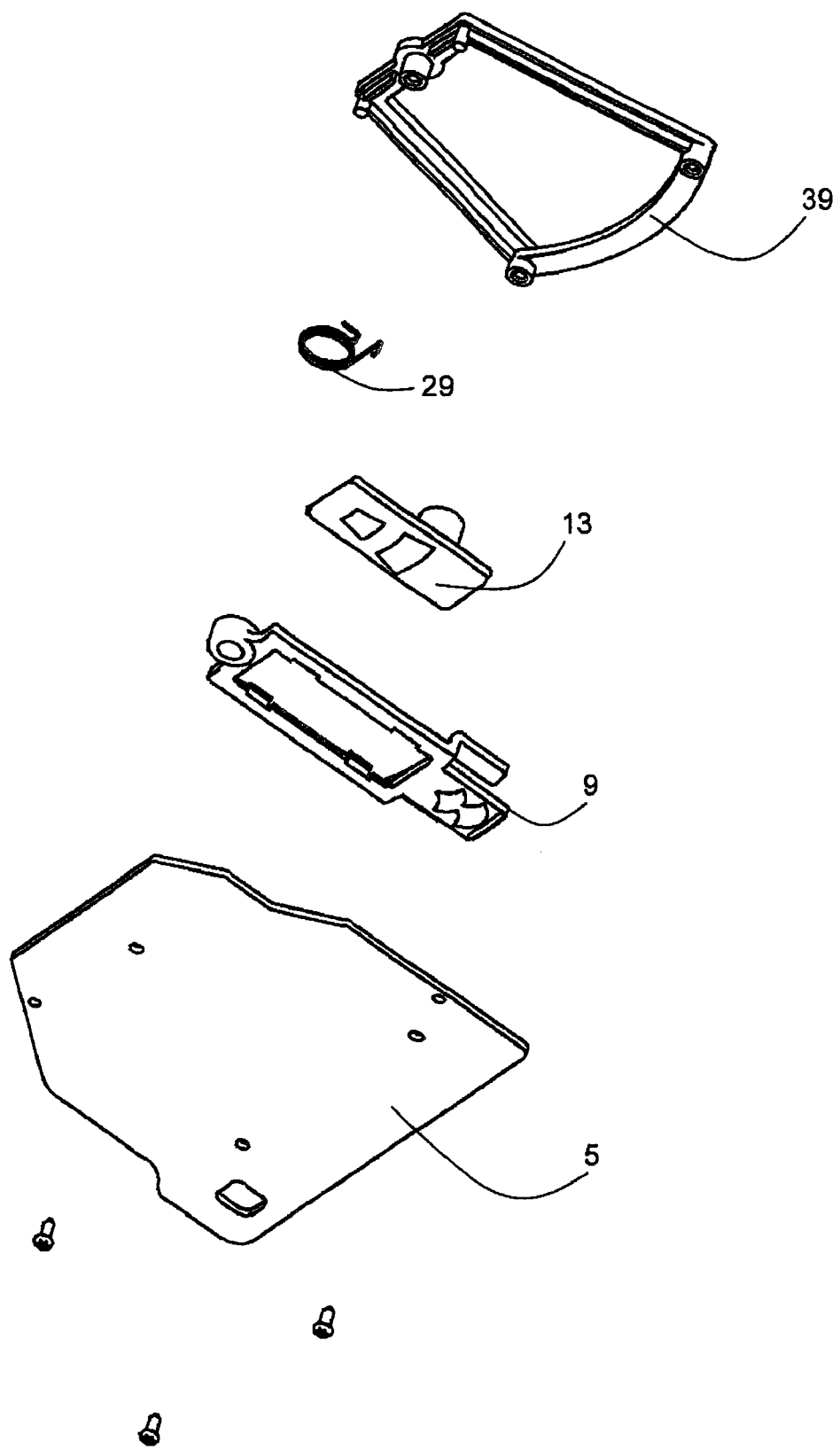
FIG. 12b is another angle sensor as in FIG. 12a, viewed from the bottom of the printed circuit board.
Figure 13A:
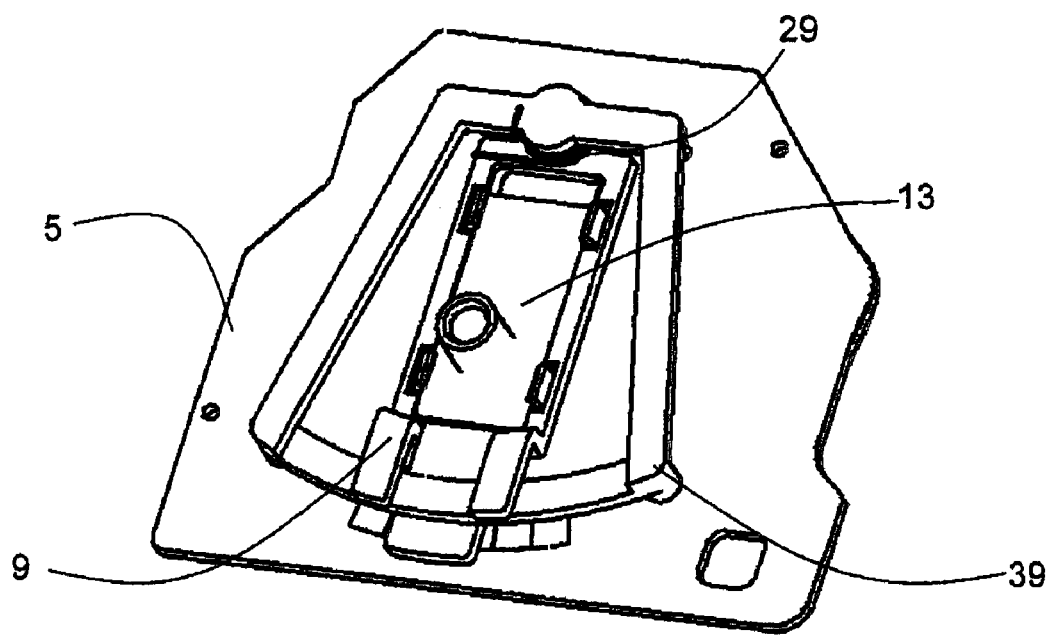
FIG. 13a is another angle sensor as in FIG. 12a, in an assembled condition, viewed from the sensor side.
Figure 13B:
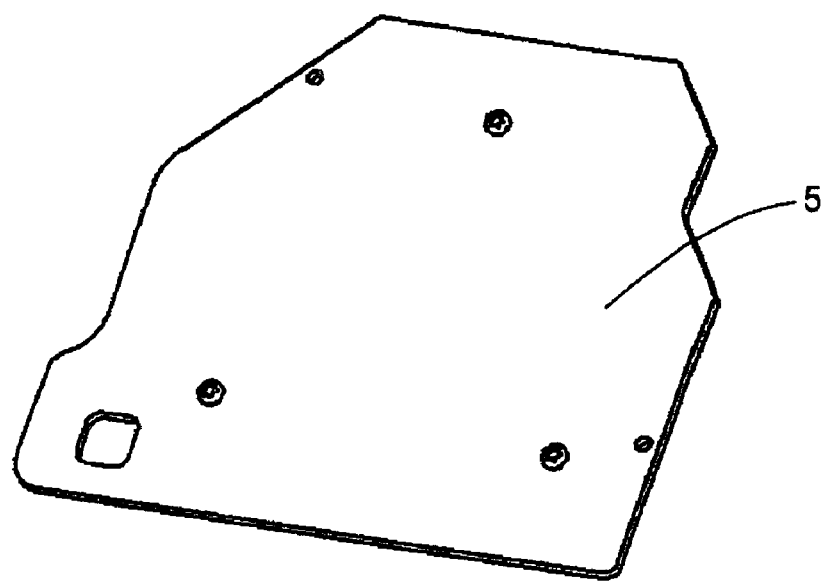
FIG. 13b is another angle sensor as in FIG. 12b, in an assembled condition, viewed from the bottom side.

An additional example for an angle sensor with a forced guidance can be seen in FIG. 12 and FIG. 13. In this case, a separate rotor guide 39 has been provided, instead of the surrounding of the printed circuit board 5. The rotor guide 39 is attached to the printed circuit board 5, in accordance with FIG. 13a. Intended as an attachment fixture, in accordance with FIG. 13b, is a screw connection on the back side, or other options like a plug connector or hook connection. In FIG. 12a and FIG. 13a it can be seen how the rotor 9 and its damping part, by means of the rotor guide 39, maintain a steady spacing to the inductor coils of the printed circuit board 5. The spacing between the damping parts and the inductor coils does not change, even if the rotor, as an example, warps, due to temperature conditions.

Reference Characters
1 Gear Selector Lever
3 Angle Sensor
5 Printed Circuit Board
7 Additional Sensor (Angle Sensor)
9 Rotor
10 Rails
13 Slider
15 Rotary Bearing
16 Slide Path
19 Bracket
21 Ball Extension
29 Spring
30 Tilting Lever
31 Pressure Spring
32 Guiding Part
33 Axle Receptacle
35 Leg Spring
37 Sleeve
39 Rotor Guide
41 Fear Screw
42 Snap-in Hook

The invention claimed is:

1. An electronic selector lever module comprising:
a mechanism for converting a shifting path motion (P, R, N, D; P, R, N, D, S) of a gear selector lever (1) into rotating motion for a first angle sensor (3) mounted on a printed circuit board (5),
and for converting transverse motion (D+, D−, M), transverse to the shifting path of the gear selector lever (1), into a detectable motion, via an additional angle sensor (7) located on the printed circuit board (5),
whereby the mechanism comprises interacting moving parts of:
a rotor (9) having a rotary motion for activating the first angle sensor (3),
a slider (13), being radially guided by the rotor (9) in its rotation level, as, variable length lever arm (11, 13, 15), whereby the transverse motion (D+, D−; M) of the gear selector lever (1) coming from the level of the shifting path, which is made at a corresponding angle position of the rotor (9), using an additional change in length of the lever arm (11, 13, 15) as a rotary motion of a tilting lever (30) for the additional angle sensor (7),
the gear selector lever (1) engages, via a ball extension (21), a sleeve (37) of the slider (13) such that every motion component of the gear selector lever (1), in a direction of the axial sleeve (37), is compensated for without conveying the motion component, while other motion components of the gear selector lever (1), residing on the level of the printed circuit board (5), are converted into the two rotating motions.

2. The electronic selector lever module according to claim 1, wherein the transverse motion (D+, D−) of the gear selector lever (1), transverse to the shifting path (P, R, N, D, S), is a tilting motion for one of a manual up-shift and a down-shift of the gear in a shifting boundary.

3. The electronic selector lever module according to claim 1, wherein the transverse motion (M) of the gear selector lever, transverse to the shifting path (P, R, N, D, S), is a change of the path into an additional shifting path (M+, M, M−) of the shifting boundary.

4. The electronic selector lever module according to claim 3, wherein a tilting motion (M+, −) is executed, in the additional shifting path (M+, M, −), for one of a manual upshift and a downshift of the gear.

5. The electronic selector lever module according to claim 4, wherein the tilting motion, in the additional shifting path (M+, M, M−), is transformed into a rotary motion of the tilting lever (30).

6. The electronic selector lever module according to claim 5, wherein the tilting lever (30) carries an electrically conducting actuator for interacting with the additional angle sensor (7).

7. The electronic selector lever module according to claim 5, wherein the tilting lever (30) is moved by the sleeve (37) of the slider (13).

8. The electronic selector lever module according to claim 7, wherein the ball extension (21) of a bracket (19) is guided in the sleeve (37) of the slider (13).

9. The electronic selector lever module according to claim 6, wherein, in case of a material breakage, the tilting lever (30) is pre-loaded by a spring (29).

10. The electronic selector lever module according to claim 9, wherein the spring (29) is a torsion spring.

11. The electronic selector lever module according to claim 10, wherein the tilting lever (30), following material breakage, is biased by the spring (29) into a position having a breakage recognition coil.

12. The electronic selector lever module according to claim 10, wherein the tilting lever (30), following material breakage, is biased by the spring (29) into a position without a coil such that a signal is not generated.

13. The electronic selector lever module according to claim 1, wherein the first angle sensor (3) and the additional angle sensor (7) contain several flat inductor coils arranged together as a circular segment.

14. The electronic selector lever module according to claim 13, wherein the rotor (9) carries at least one electrically conducting actuator for interacting with the inductance of the flat coils.

15. The electronic selector lever module according to claim 1, wherein the first angle sensor (3) is a redundant circular segment which comprises additional flat inductor coils positioned side by side.

16. The electronic selector lever module according to according to claim 1, wherein the printed circuit board (5) has a counter bearing, on a side opposite to the side containing the first and additional angle sensors (3, 7), and a pin passes through the printed circuit board (5) for supporting the rotor (9).

17. The electronic selector lever module according to claim 16, wherein the counter bearing is attached with bars which pass through the printed circuit board (5).

18. The electronic selector lever module according to claim 17, wherein the bars carry an enclosure for covering and guiding the rotor (9).

19. The electronic selector lever module according to claim 1, wherein the slider (13) is guided relative to the rotor (9) on rails (11).

20. The electronic selector lever module according to claim 1, wherein the additional angle sensor (7) comprises several flat inductor coils which are configured side by side as a circular segment.

* * * * *